June 24, 1969   D. G. HILL ET AL   3,451,225
WATER-JACKET WARMER FOR STATIONARY FUEL TANK
Filed Feb. 8, 1968   Sheet 1 of 2
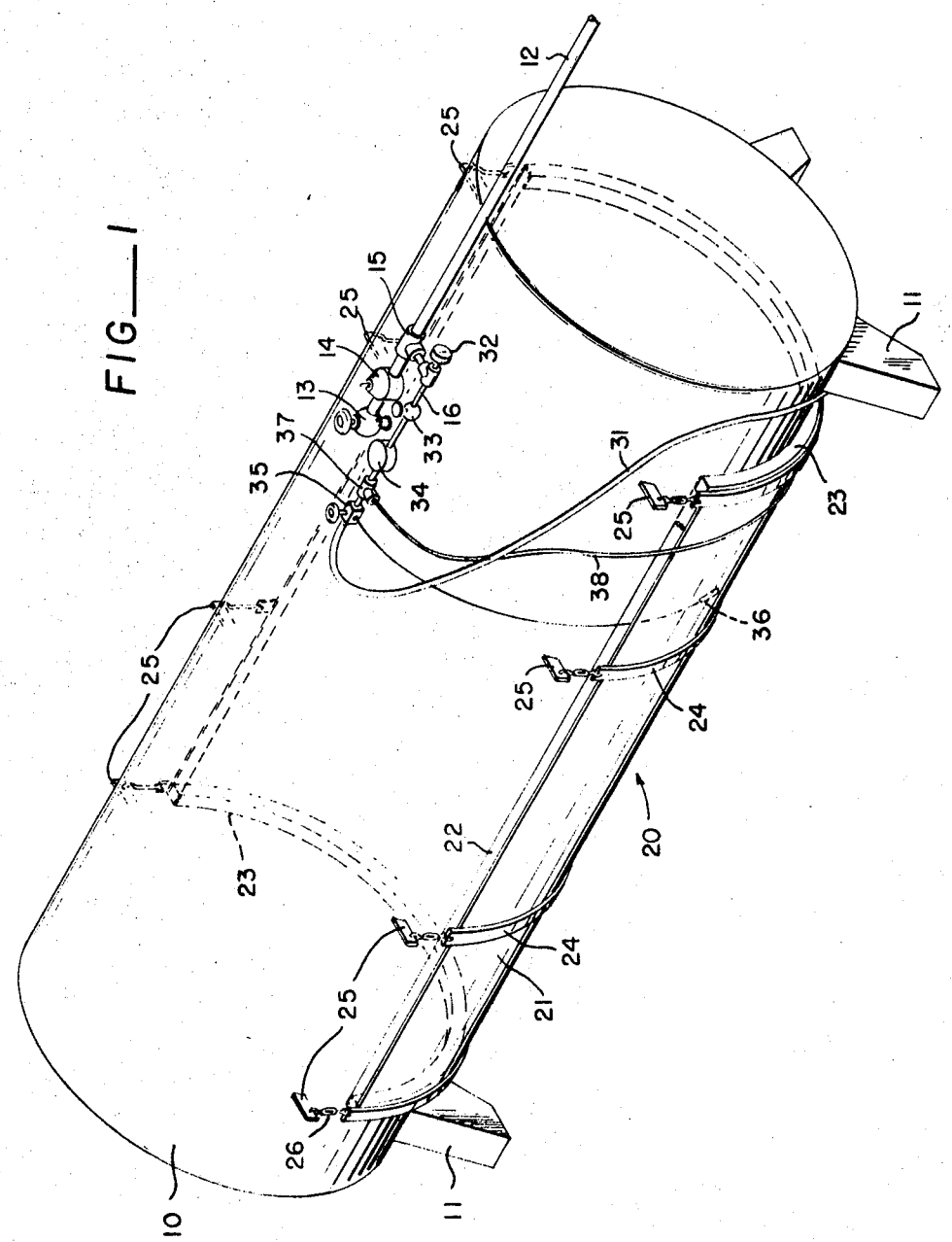
DARYL G. HILL
RODERICK C. ROBERT
INVENTOR.
BY *Seed, Berry & Dowrey*
ATTORNEYS

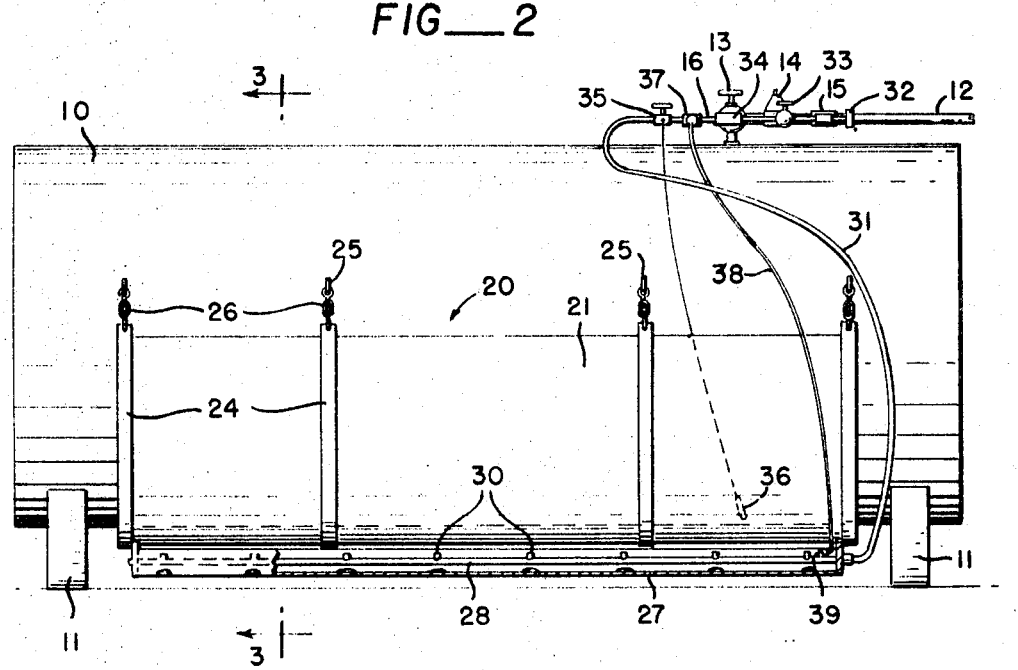
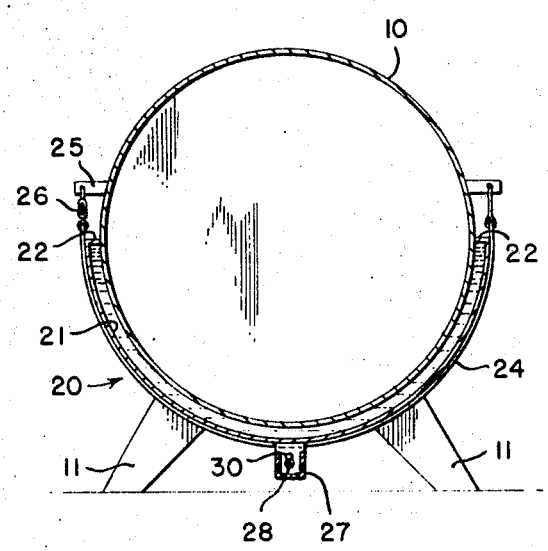

United States Patent Office 3,451,225
Patented June 24, 1969

3,451,225
WATER-JACKET WARMER FOR STATIONARY FUEL TANK
Daryl G. Hill, 523 N. 24th Ave., and Roderick C. Robert, 521 N. 24th Ave., both of Yakima, Wash. 98101
Filed Feb. 8, 1968, Ser. No. 704,066
Int. Cl. F17c 7/02, 13/10
U.S. Cl. 62—50           5 Claims

ABSTRACT OF THE DISCLOSURE

A water-jacket warmer for propane or other like fuel supply tank strapped to the underside of the tank, controlled thermostatically by the temperature of the water within the jacket and fueled from the tank.

---

The invention relates to a water-jacket warmer for use in providing freeze-protection for liquid fuels such as propane and butane contained in stationary supply tanks. One object is to provide an efficient warmer for this purpose which will assure long and trouble-free operation, which is substantially automatic in its functioning, and which will require no more than a modicum of servicing attention. A further and particular object is to provide a device for this purpose which is inexpensive to manufacture and which can be quickly and easily applied to the tank or, should occasion demand, be removed therefrom. As a yet further and important object the invention aims to provide a device which is fueled from the fuel which is contained in the supply tank.

Still a further and important object of the invention is to provide a means of heating a liquid supply tank which is so related to the tank that it is safe, will not overheat the tank or cause an explosion.

The means of heating a liquid supply tank herein described is especially adapted for use in supplying gas to orchard heaters of the type described in my co-pending application Ser. No. 576,057, filed Aug. 30, 1966, now abandoned.

The above and yet additional objects and advantages will appear and be understood in the following detailed description and claims, the invention consisting in the novel construction and in the adaptation and combination of parts hereinafter described and claimed.

In the accompanying drawings:

FIG. 1 is a perspective view illustrating a stationary propane supply tank equipped with a warmer embodying preferred teachings of the present invention.

FIG. 2 is a side elevational view thereof with parts broken away and shown in section; and FIG. 3 is a transverse vertical sectional view on the line 3—3 of FIG. 2.

Referring to said drawings, the numeral 10 denotes a stationary supply tank for propane, butane or other like liquefied carbonaceous fuel subject to freezing under low-temperature conditions. Legs 11 support the tank in elevated relation to the ground. A main supply line through which the fuel is fed to burners (not shown) is denoted by 12 and at the tank end this main line is fitted with a cut-off valve 13, a pressure regulator 14, and a T-fitting 15. The T-fitting connects by its side branch with a tank-warming supply line 16, hereinafter to be described.

The water-jacket warmer is denoted generally by 20 and is wrapped over the underside or belly portion of the tank. It is produced from a rectangular plate 21 of galvanized sheet metal of a sufficiently heavy gauge to be moderately stiff but yet capable of being flexed to fit the curving contour of the cylindrical tank. Along each of the side edges the plate presents flanges 22' bent 90° in a corresponding direction from the plane of the plate. When the jacket-forming plate is wrapped upon the tank these flanges point inwardly. The span between said side flanges desirably approximates one-half the circumference of the tank. Compressible rubber gaskets 23, somewhat thicker in their non-compressed state than the projection of the flanges, are cemented or otherwise suitably attached to the plate's interior face along each end edge.

The gaskets are adapted to be pressed against the tank, establishing water-tight seals, and for this purpose we employ metal sling-straps 24. The straps are or may be spot-welded to the jacket. Rows of eyed lugs 25 are welded to the tank along each of the two sides. Each strap has one of its ends hooked to a respective lug in one of the rows and is tensioned upon the jacket by means of a turn-buckle 26 which connects the other end of the strap to a respective lug in the other row.

The rubber gaskets normally are compressed in a degree sufficient to bring the flanges 22 into approximate touching engagement with the sides of the tank. In this condition the flanges protect water within the jacket against access of dust, dirt or other foreign object. When initially supplying water to the jacket, or replenishing the same, the procedure is to slack off the turn-buckles until a slit appears between the flanges and the tank wall. Water is then poured onto the top of the tank, running down the sides and through the slit into the water chamber.

A narrow combustion box 27 is made integral with the jacket, underlying the same on the jacket's longitudinal median line and extending the substantial length of the jacket. The box has air-admission openings in the bottom and is suitably vented for the escape of spent gases of combustion.

A manifold pipe 28 carrying a multiplicity of burner nozzles 30 is housed within the combustion box and is fueled through a flexible hose 31 feeding from the aforementioned supply line 16. Fitted in said line are a pressure gauge 32, a turn-off valve 33, a pressure regulator 34, and a thermostatically controlled valve 35. A control bulb 36 for such valve 35 is immersed in the water of the jacket.

A T-fitting 37 is also provided in said supply line 16, lying between the pressure regulator 34 and the control valve 35. A line 38 from the side branch of such T-fitting leads to a windproof pilot light 39 housed in the combustion box.

It is extremely important in heating supply tanks containing inflammable gases or liquids that all safety precautions be taken. The construction herein described provides a safe and approved means of heating such tanks. Fire regulations do not permit application of flame directly to the surface of the tank. We apply the heat to the jacket forming shield. The water within the jacket is heated and provides relatively uniform temperature over the surface of the tank surrounded by the jacket. The heat against the tank cannot exceed the boiling point of water or 212° F. Also if the water accidently drains from the jacket, the jacket provides a shield so that the flame is never directly against the tank.

It is believed that it will be readily understood that as the gas in the tank is rapidly withdrawn, there is normally a substantial reduction in the temperature of the gas. By increasing the temperature of the gas in the tank, the problems caused by the rapid reduction in temperature of the gas is substantially reduced. The control valves do not freeze-up and cause malfunction and the gas readily passes through the valves and conduits to the point of use or consumption such as in the orchard heaters described in my co-pending patent application.

It is believed that the invention and the manner of its operation will have been clearly understood from the foregoing detailed description of our now-preferred illustrated embodiments. Changes in the details of construction may be resorted to without departing from the spirit of the invention and it is accordingly our intention that no limitations be implied and that the hereto annexed claims be given the broadest interpretation to which the employed language fairly admits.

The embodiments of the invention in which an exclusive property or privilege is claimed are defined as follows:

1. In combination with a stationary cylindrical liquid-fuel tank, a casing member providing a water chamber and formed so as to be applied as a jacket to the belly portion of the tank, the jacketing member being comprised of a plate of moderately stiff sheet metal capable of being flexed to fit the curving contour of the tank and adjacent each of the two end edges faced on the interior surface with a compressible sealing strip, tensioned means being provided for releasably holding the jacketing member on the tank with the sealing strips drawn tight against the exterior wall thereof, and means for heating water contained in the chamber.

2. Structure as claimed in claim 1 in which said holding means comprises metal sling-straps which saddle the jacketing member and have their two ends attached to lugs which are made integral with the tank, at least one of said end attachments including a manual take-up.

3. Structure as claimed in claim 1 in which the sheet metal plate has an approximately rectangular plan configuration with inturned flanges along each of the two side edges dimensioned so as to be brought into approximate touching engagement with the exterior of the tank upon said tensioned compression of the sealing strips.

4. In combination with a stationary cylindrical liquid-fuel tank, a casing member providing a water chamber and formed so as to be applied as a jacket to the belly portion of the tank, the jacketing member being comprised of a plate of moderately stiff sheet metal generally rectangular in plan configuration capable of being flexed to fit the curving contour of the tank and adjacent each of the two end edges faced with a compressible sealing strip which is adapted to seat upon and be pressed tight against the exterior wall of the tank, means being provided for holding the jacketing member upon the tank with said sealing strips pressed tightly against the same, the heating means comprising a row of burner nozzles closely underlying the jacket on approximately the longitudinal median line of the tank and fueled through a common manifold from the fuel contained in the tank, and means for heating water contained in the chamber.

5. Structure as claimed in claim 4, a pilot light being provided for the nozzles and having means operated automatically by the temperature of the water contained in the tank for governing the volume of fuel supplied to the manifold.

References Cited

UNITED STATES PATENTS

| | | | |
|---|---|---|---|
| 2,142,065 | 12/1938 | Youngblood | 62—50 |
| 2,151,060 | 3/1939 | Tschudy et al. | 62—50 |
| 2,216,866 | 10/1940 | White | 62—50 |
| 2,252,261 | 8/1941 | Jones | 62—51 |
| 2,445,059 | 7/1948 | Garretson | 62—50 |
| 2,618,935 | 11/1952 | Malir | 62—52 |

FOREIGN PATENTS 1,088,794 9/1954 France.

LLOYD L. KING, *Primary Examiner.*

U.S. Cl. X.R.

62—52